(12) United States Patent
Demopoulos et al.

(10) Patent No.: US 6,391,270 B1
(45) Date of Patent: May 21, 2002

(54) METHOD FOR REMOVING MANGANESE FROM ACIDIC SULFATE SOLUTIONS

(75) Inventors: George P. Demopoulos, Outremont; Lucy Rosato, Town of Mount Royal; Qiankun Wang, Montreal, all of (CA)

(73) Assignees: Noranda Inc.; McGill University, both of (CA)

( * ) Notice: Subject to any disclaimer, the term of this patent is extended or adjusted under 35 U.S.C. 154(b) by 0 days.

(21) Appl. No.: 09/471,225

(22) Filed: Dec. 23, 1999

(51) Int. Cl.[7] .................. C22B 47/00; C22B 19/00; C25C 1/00
(52) U.S. Cl. .................. 423/50; 205/607
(58) Field of Search ............... 423/50; 205/607

(56) References Cited

U.S. PATENT DOCUMENTS

| | | |
|---|---|---|
| 318,603 A | 5/1885 | Deumelandt |
| 2,614,030 A | 10/1952 | Kamlet ............... 23/145 |
| 2,779,659 A | 1/1957 | Koslov ............... 23/145 |
| 3,349,031 A | 10/1967 | Hatch et al. ............ 210/50 |
| 3,685,965 A * | 8/1972 | Kniprath ............... 423/605 |
| 4,006,217 A | 2/1977 | Faber et al. ............ 423/605 |
| 4,029,498 A | 6/1977 | Okajima ............... 75/103 |
| 4,029,733 A | 6/1977 | Faugeras et al. ......... 423/21 |
| 4,067,789 A * | 1/1978 | Harris et al. ............ 423/50 |
| 4,290,866 A | 9/1981 | Bolton et al. ........... 204/119 |
| 4,379,037 A | 4/1983 | Bolton et al. ........... 204/119 |
| 4,812,302 A | 3/1989 | Laughlin et al. ......... 423/605 |
| 5,009,793 A | 4/1991 | Muller ................. 210/710 |
| 5,932,086 A | 8/1999 | Kasaaian ............... 205/573 |

FOREIGN PATENT DOCUMENTS

| | | |
|---|---|---|
| CA | 935650 | 10/1973 |
| WO | 00/56943 | 9/2000 |
| WO | 00/61826 | * 10/2000 |

OTHER PUBLICATIONS

Q. Wang and G.P. Demopoulos, "A novel process for arsenic oxidation and fixation," *Waste Processing and Recycling III*, 37th Annual Conference of Metallurgists, Aug. 16–19, 1998 (pp. 375–387).

E.A. Devuyst et al., "Oxidizing Properties and Applications of the SO2–O2 System," *Hydrometallurgy Research, Development and Plant Practice*, 3rd International Symposium on Hydrometallurgy, Mar. 6–10, 1983 (pp. 391–403).

* cited by examiner

*Primary Examiner*—Steven Bos
(74) *Attorney, Agent, or Firm*—Katten Muchin Zavis Rosenman (57) ABSTRACT

A method and apparatus for precipitating manganese from acidic sulfate solutions, and more specifically from zinc leach solutions, without removing zinc. A zinc- and manganese-containing solution is treated with an $SO_2$—$O_2$ gas mixture at the appropriate pH and temperature, thereby causing manganese to precipitate as a trivalent and/or tetravalent manganese hydroxides and/or oxides that report to the leach residue or are removed separately from solution by solid/liquid separation. These trivalent and/or tetravalent manganese compounds may be used as oxidants in other parts of the leach circuit.

59 Claims, 7 Drawing Sheets

Mn control option 1 – oxidative precipitation of Mn(II) in neutral leach solution by using $SO_2/O_2$ gas mixture.

Figure 1. Oxidative precipitation of Mn(II) by $SO_2$-$O_2$ gas mixture. (pH=4.6, initial Mn concentration=10 g/L, $O_2$=100 mL/min, $SO_2$=40mL/min, 80°C, 1000rpm, 10 g/L $MnO_2$ seed).

Figure 2. Effect of pH on oxidative precipitation of Mn(II) by $SO_2$-$O_2$ gas mixture. (initial Mn concentration=10 g/L, $O_2$=100 mL/min, $SO_2$=40mL/min, 80°C, 1000rpm, 10 g/L $MnO_2$ seed, neutralising agent: calcine).

Figure 3. Effect of SO$_2$ flowrate on oxidative precipitation of Mn(II) by SO$_2$-O$_2$ gas mixture. (pH=4.6, initial Mn concentration=10 g/L, O$_2$=100 mL/min, 80°C, 1000rpm, neutralising agent: calcine).

Figure 4. Effect of $O_2$ flowrate on oxidative precipitation of Mn(II) by $SO_2$-$O_2$ gas mixture (pH=4.6, initial Mn concentration=10 g/L, $SO_2$=40 mL/min, 80°C, 1000rpm, neutralising agent: calcine).

Figure 5. Oxidative precipitation of Mn(II) from neural leach slurry by $SO_2$-$O_2$ gas mixture. (initial Mn concentration=11.23 g/L, $O_2$=100 mL/min, $SO_2$=40 mL/min, 80°C, 1000rpm, neutralising agent: calcine).

Figure 6. Mn control option 1 – oxidative precipitation of Mn(II) in neutral leach solution by using $SO_2/O_2$ gas mixture.

Figure 7. Apparatus for precipitating Mn(II) from neutral leach solution.

METHOD FOR REMOVING MANGANESE FROM ACIDIC SULFATE SOLUTIONS

BACKGROUND OF THE INVENTION

1. Field of the Invention

The present invention relates to the removal of manganese ions from acidic sulfate solutions, and more specifically to the removal and control of manganese in neutral leach or weak acid leach solutions and circuits. Using the method of the present invention, manganese can be precipitated from the leach solution containing valuable non-ferrous metals, such as copper, nickel, cobalt, zinc, or combinations of these, without causing the metal(s) of interest to precipitate from the solution. The present invention also relates to an apparatus for treating an acidic sulfate solution, and preferably a zinc leach solution, to selectively remove manganese without precipitating zinc from the solution.

2. Description of The Related Art

The great majority of zinc is produced via hydrometallurgical processing of zinc sulfide concentrates. Typically, such concentrates are produced via flotation, and are subjected to roasting, followed by leaching in sulfuric acid solution, purification of the solution, and recovery of metal via electrolysis (electrowinning). As an alternative to roasting, direct leaching of the concentrate either in autoclaves (i.e. pressure leaching) or under atmospheric pressure may be practiced. In all of these processing methods, any manganese in the zinc feed tends to dissolve and build-up in the solution. Hence, zinc plant operators are particularly careful to select concentrates for treatment that are low in manganese content.

In addition to the feed itself, another source of manganese that may contribute to its build-up in zinc solution is manganese-based oxidants (such as pyrolusite or permanganate) that are used to facilitate the oxidation of ferrous iron to ferric iron, and hence its subsequent removal via precipitation (as ferric hydroxide-ferrihydrite in the neutral leach stage or jarosite, goethite or hematite in the hot acid leach stage(s)). Manganese enters the solution in its soluble divalent state and accumulates, causing problems with the operation of the plant, especially in the tankhouse. Some manganese (II) is desirable in the electrolyte (approximately 2 to 5 g/L), as it results in the deposition of a protective $MnO_2$ coating on the lead anodes that otherwise undergo rapid corrosion.

Bleed off of electrolyte, in addition to manganese deposition on the anodes, has been the conventional means of controlling manganese in zinc process solution when the feeds processed are very low in manganese content. However, such an approach is not adequate if concentrates rich in manganese are to be processed. For this case, a chemical method that will remove manganese selectively while leaving zinc in solution needs to be devised and implemented, so as to prevent the unacceptable excessive build-up of manganese.

In the past, the chemical removal of manganese from acidic sulfate solutions, particularly those containing zinc, was accomplished via the use of strong oxidants such as ozone, Caro's Acid, or potassium permanganate, although these methods are not well-suited for industrial use. Of these, the use of ozone to cause the oxidative precipitation and removal of manganese from zinc-containing sulphate solutions in the form of manganese dioxide and the separation of it from solution by filtration has been described in U.S. Pat. No. 4,290,866 and its companion patent No. 4,379,037. According to this patent, spent electrolyte (and not the leach solution), i.e., the solution exiting the tankhouse containing approximately 50 g/l Zn(II) and 180 g/L $H_2SO_4$ is treated with ozone to remove manganese via oxidative precipitation. Although this method is technically feasible, it does, however, suffer from the high cost of the oxidant used. The same drawback is associated with the use of Caro's acid or potassium permanganate.

Use of $SO_2$—$O_2$ gaseous mixtures has been reported in literature for the oxidation of a number of substances, such as cyanide, ferrous iron, nickel (See E. A. Devuyst et al., Hydrometallurgy: Research, Development and Plant Practice, published by TMS, Warrendale, Pa. (1983), pp. 391–403), and arsenic (See Q. Wang et al., *Waste Processing and Recycling III*, published by CIM, Montreal, QC (1998), pp375–387), but not for the selective oxidation of manganese from acidic sulfate solution such as a zinc leach solution, or a solution containing other non-ferrous metals such as copper, nickel, and cobalt, and complex concentrates containing them.

U.S. Pat. No. 4,029,498 describes the use of $SO_2/O_2$ (Air) to remove manganese from solution, but the solution used in that application was alkaline in nature, and was produced by the ammoniacal leaching of manganese nodules. The solutions treated using this process contained chloride salts in addition to ammonia (this is a base that makes the solution alkaline), and therefore they are distinctly different in their chemical make-up from the acidic sulfate solutions containing non-ferrous metals such as zinc, copper, nickel, and cobalt, to which the present invention applies.

The process for making manganese described in U.S. Pat. No. 5,932,086 is also clearly distinct from the process of the present invention, as it involves treating a source of manganomanganic oxide in a leach solution in the presence of a reducing agent to convert the manganomanganic oxide to manganese sulfate. The source of manganese is leached in a sulfuric acid solution using $SO_2$ as a reducing agent. The reducing agent causes manganese (II) oxide to form, which is further converted to manganese sulfate solution from which ultimately manganese is recovered by electrolysis after a number of manipulations.

U.S. Pat. No. 2,779,659 describes a method of recovering manganese from ore by leaching with nitric acid, followed by an oxidizing step to form $MnO_2$. Air or $O_2$ may be used as the oxidant. The method of treating water set forth in U.S. Pat. No. 3,349,031 is also relevant to the present invention in that it utilizes compounds that yield bisulfite ions to remove manganese. The method described in this patent is directed toward use in treating water containing manganese in very small quantities, and is not suitable for use in treating an industrial leach solution.

Accordingly, there is a need for a method and apparatus for selectively removing manganese from an acidic sulfate solution containing zinc, such as a zinc leach solution. Such a method and apparatus will allow for the economic treatment of zinc concentrate feedstocks rich in manganese that are not otherwise treatable by the processes of the prior art. An additional advantage of this new method is that the manganese removal process has the potential of removing other deleterious impurities via co-precipitation, thus making the downstream purification operation even easier. This method and apparatus also provide greater ease of application.

The present invention provides a new process and system for selectively removing manganese from acidic sulfate solutions containing valuable, non-ferrous metals such as zinc, copper, nickel, and cobalt, allowing the effective control of manganese in hydrometallurgical plants. This novel process makes use of common chemical reagents (such as $O_2$ and sulfite salts or gaseous $SO_2$) that are abundantly and inexpensively available in such plants.

OBJECTS OF THE INVENTION

It is the object of the present invention to provide a method for removing manganese from a metalliferrous acid sulfate solution by reacting the solution with sulfite and oxygen.

A further object of the present invention is to provide a method for removing manganese from a zinc leach solution without causing the zinc to precipitate. The zinc leach solution is reacted with sulfite and oxygen.

Yet another aspect according to the present invention is a method for using gaseous sulfur dioxide and oxygen to remove manganese from a zinc leach solution. The solution is sparged with the sulfur dioxide and oxygen while being agitated. The reaction is preferably carried out at a temperature of from 60 to 90° C., at a pH of from 4.0 to 4.6, for three or fewer hours.

An additional object of the present invention is to control manganese in a zinc leach circuit using several steps. A portion of the leach solution is bled off from the main stream of the zinc leach circuit into a separate tank, where it is treated with sulfite and oxygen to cause manganese to precipitate from the solution, without causing zinc present in the solution to precipitate. The pH of the solution is neutralized with a neutralizing agent while the manganese is being precipitated. The solution is also filtered to remove the manganese precipitate.

Still a further object of the present invention is to provide a method for controlling manganese in a zinc leach circuit by treating a zinc leach slurry within the leach circuit using sulfite and oxygen. The reaction of the slurry with the sulfite and oxygen causes manganese to precipitate from the slurry, without causing the zinc to precipitate. A neutralizing agent is used to neutralize the pH of the slurry during the precipitation step.

Another object of the present invention provides a method for producing zinc from a zinc sulfide concentrate. The concentrate is roasted, and then leached in a sulfuric acid solution. The solution is purified, and zinc is recovered from the solution by electrolysis. The manganese present in the solution is removed by reacting the solution with sulfite and oxygen.

A further object of the invention is to provide an apparatus for removing manganese from a zinc sulfate solution via oxidation, comprising means for mixing gaseous $SO_2$ and $O_2$ at a molar ratio of $O_2$ to $SO_2 \geq 1$, means for agitating the solution, and means for sparging the gaseous $SO_2$ and $O_2$ into the agitating solution until a predetermined amount of manganese is precipitated.

DETAILED DESCRIPTION OF THE PRESENTLY PREFERRED EMBODIMENTS

The novel method of the present invention achieves the removal of manganese from zinc sulphate solutions via its oxidation with a mixture of sulfite and $O_2$. The present invention utilizes sulfites in the form of gaseous $SO_2$ or as a solid salt of sulfites or metabisulfites, or in any other suitable source of sulfite ions. Divalent manganese (II) is present in leach solutions of non-ferrous metals including copper, nickel and cobalt, and particularly zinc, and is produced during the hydrometallurgical processing of concentrates or ores. Divalent manganese is soluble in such solutions, and upon oxidation of manganese to the trivalent (III) or tetravalent (IV) state, it precipitates out of the solution due to the non-solubility of Mn(III) and Mn(IV) (hydro-) oxides. Although the removal of manganese from a solution in the form of insoluble $MnO_2$ or similar compounds by the use of strong oxidants such as ozone and Caro's acid has been described before, this is the first time that the use of the gaseous mixture of $SO_2$—$O_2$ is proposed for this application.

According to this new method, when $SO_2$ is used as the source of sulfite, the gaseous $SO_2$ and $O_2$ may be pre-mixed in an appropriate molar ratio (preferably $O_2:SO_2 \geq 1$), and are then sparged into a well-agitated zinc leach solution for as long as necessary (typically less than three hours) to remove the desired amount of manganese. Oxygen may be introduced as plain air or $O_2$-enriched air, although it is preferred to use $O_2$ without significant inert gas content. The process is typically carried out at 80° C. (the temperature of neutral zinc leach solution from a plant circuit) at pH higher than 2 and lower than the pH that causes precipitation of basic zinc sulphate. The preferred pH is somewhere between 4 to 4.6. The temperature may vary from 20 to 100° C., but the actual temperature of the neutral leach solution from the plant circuit, which is typically in the range of 60 to 90° C., is the preferred temperature of operation. In terms of zinc manganese concentration, the leach solution may contain typically from 30 to 170 g/L Zn and 1 to 25 g/L manganese. Table 1 shows the results of several tests conducted using this method. Other acid sulfate leach solutions produced from the treatment of low grade or complex feeds of zinc with lower zinc and/or higher manganese concentrations may be treated as well.

TABLE 1

Test conditions and results.

| No | pH | $O_2$ mL/min | $SO_2$ mL/min | Temp, °C. | $MnO_2$, g/L | Fe(III), g/L | Neutralising agent | %, Mn precipitated |
|---|---|---|---|---|---|---|---|---|
| 1 | 4.0 | 100 | 40 | 80 | | | $Na_2CO_3$ | 18 |
| 2 | 4.0 | 100 | 0 | 80 | | | $Na_2CO_3$ | 0 |
| 3 | 2.0 | 100 | 40 | 80 | 15 | 1.0 | $Na_2CO_3$ | 0 |
| 4 | 4.0 | 100 | 40 | 90 | | 1.0 | $Na_2CO_3$ | 26 |
| 6 | 4.55 | 100 | 40 | 80 | | | $Na_2CO_3$ | 3 |
| 9 | 4.55 | 100 | 40 | 80 | 10 | | $Na_2CO_3$ | 62 |
| 12 | 4.55 | 100 | 40 | 80 | 10 | | $Na_2CO_3$ | 93 |
| 7 | 4.55 | 100 | 40 | 80 | 10 | | $Na_2CO_3$ | 100 |
| 8 | 4.55 | 100 | 40 | 80 | 10 | | Calcine | 100 |
| 10 | 4.0 | 100 | 40 | 80 | 10 | | Calcine | 57 |
| 11 | 3.5 | 100 | 40 | 80 | 10 | | Calcine | 19 |

The process of precipitating manganese from the solution generates acid, and gradually lowers the pH below the optimum operating range for the method of the present invention. In order to maintain the pH at the desired level a base has to be added simultaneously with the sulfite and $O_2$ to neutralize the generated acid. Different neutralizing agents like $Na_2CO_3$, NaOH, $Mg(OH)_2$, zinc calcine or other zinc oxide containing material can be used, with the zinc calcine being the preferred neutralizing agent. The neutralizing agent may be added by titration if the method is being used on a small scale. In an industrial setting, control loop monitoring may be used to monitor the pH of the solution, and automatically add neutralizing agent to the solution to maintain the pH within the desired range.

The kinetics of the manganese precipitation process and the settling/crystallinity properties of the precipitated manganese (III) or (IV) compounds may be improved if part of the precipitate is recycled. For example $MnO_2$ previously recovered from the leach solution may be used to seed the solution.

EXAMPLES

To demonstrate the effectiveness of the method of the present invention in removing manganese from zinc leach solutions and slurries, the results of a number of experiments are set forth below. All tests were performed using industrial neutral zinc leach solution or slurry obtained from CEZinc's leach plant in Valleyfield, QC. The typical test conditions were: 600 mL solution; ~150 g/L zinc; 10 g/L Mn(II); 80° C.; $SO_2$ flowrate: 40 mL/min. (unless otherwise stated); $O_2$ flowrate: 100 mL/min (unless otherwise stated); agitation speed 1000 rpm; reaction time 2 hours.

Effect of Base Type

Figure 1:
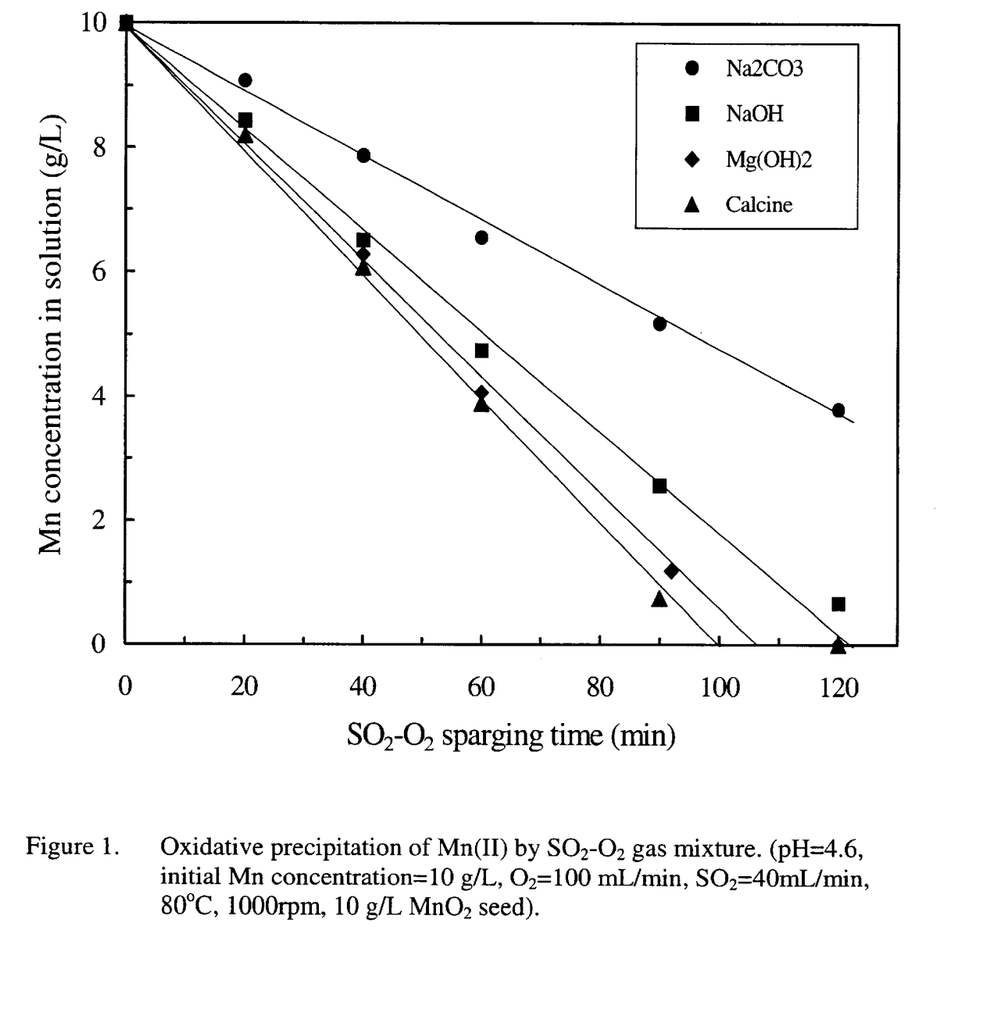
FIG. 1 is a graph showing the effects of different neutralizing agents on the oxidative precipitation of manganese from a zinc leach solution.

FIG. 1 shows the kinetic results for the oxidative precipitation of Mn(II) using four different types of bases (i.e. $Na_2CO_3$, NaOH, $Mg(OH)_2$ and calcine) for pH control. $Na_2CO_3$, $Mg(OH)2$, and calcine were added in the form of dry powder, and NaOH was added as a 10N solution. Kinetically, all the four bases give satisfying results. But calcine is considered the most suitable one because (1) it is easily available as starting material for zinc extraction; (2) its use has the least interference to zinc leach process; and (3) it provides fastest oxidative precipitation of Mn(II). In the following investigations, calcine was used in all the tests for pH control.

Effect of pH

Figure 2:
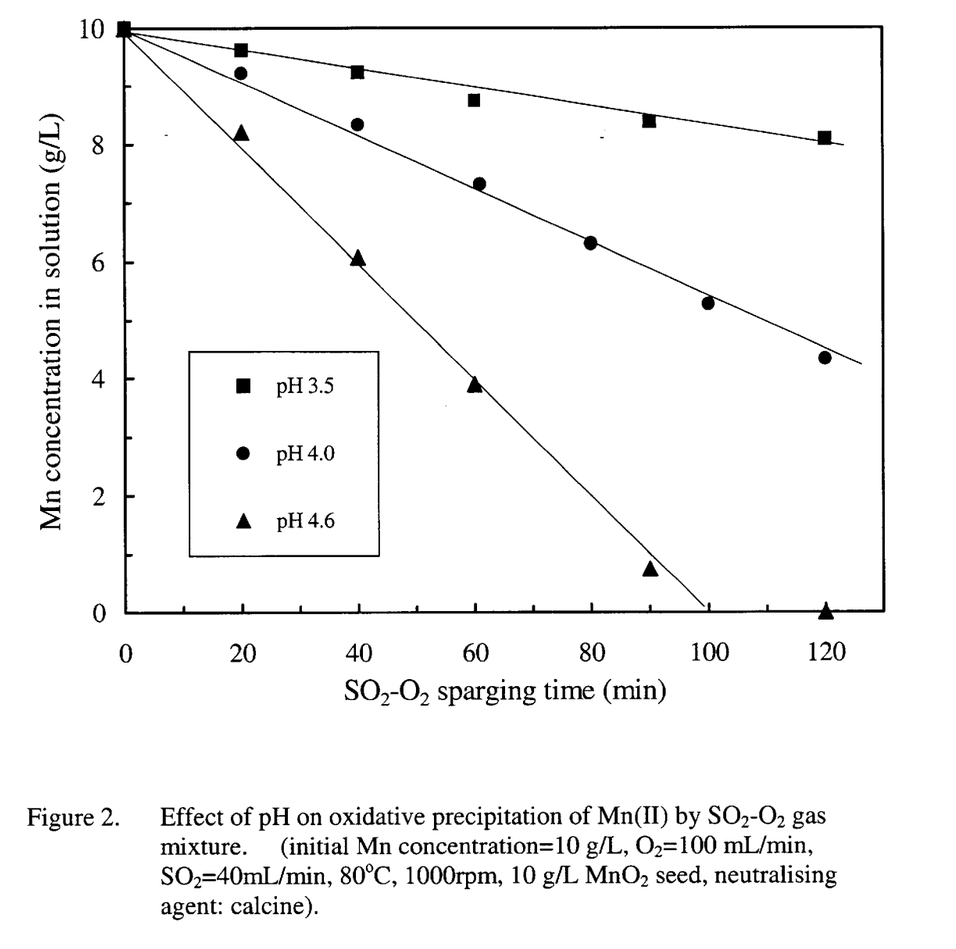
FIG. 2 is a graph showing the effects of solution pH on the oxidative precipitation of manganese from the zinc leach solution.

The effect of pH on oxidative precipitation of Mn(II) is indicated in FIG. 2. It is clear that the reaction pH affects kinetics significantly. In order to obtain effective oxidative precipitation of Mn(II), the operation pH should be preferably be maintained at or above 4.

Effect of Seed

Tests were performed with the addition of 10 g/L $MnO_2$ powder to the solution to act as seed. Such addition was found to accelerate the kinetics when $Na_2CO_3$ was used as base, but no similar measurable effect was observed when calcine was used as base. It may be assumed that some undissolved components of the calcine (i.e. zinc ferrite) act as seed hence no seed is required if other solids, as is the case of treatment of neutral leach slurries, are present.

Effect of $SO_2$ Flow Rate

Figure 3:
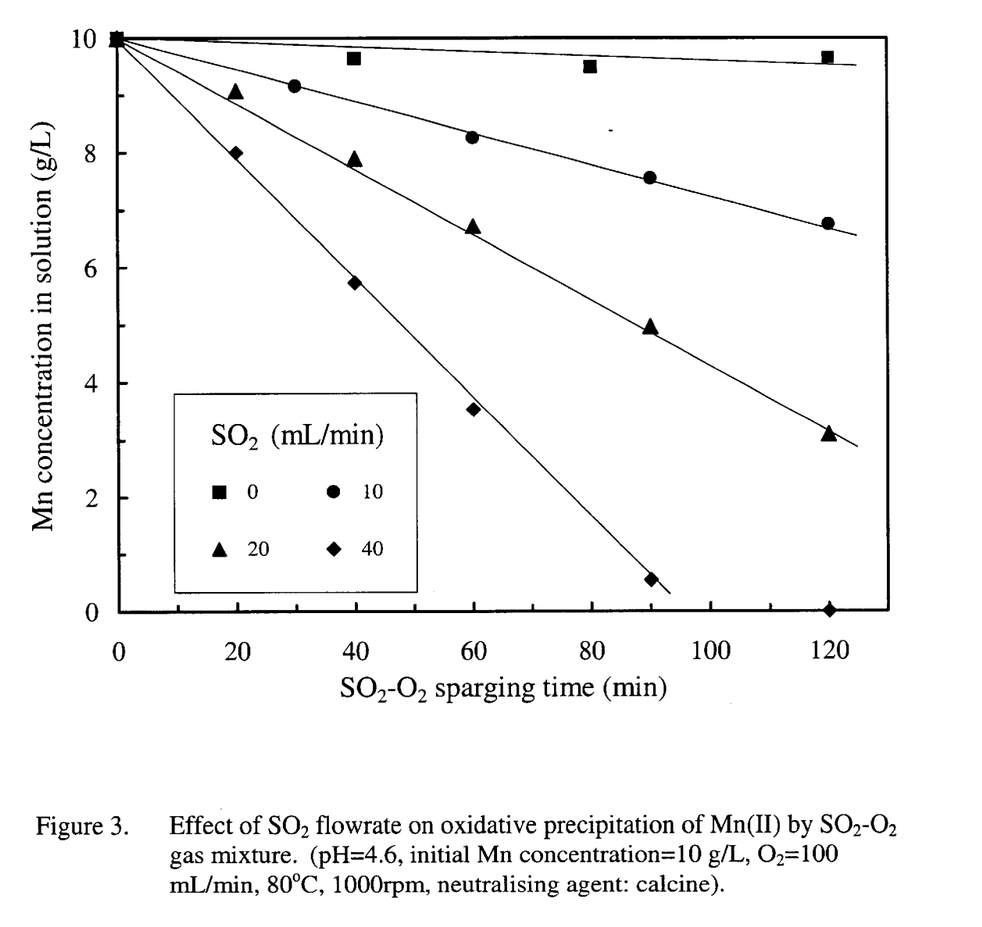
FIG. 3 is a graph showing the effects of the rate of addition of $SO_2$ on the oxidative precipitation of manganese from a zinc leach solution.

The effect of $SO_2$ flow rate on oxidative precipitation of Mn(II) was examined in the range of 0 to 40 mL/min $SO_2$ while the flowrate of $O_2$ was fixed at 100 mL/min. The results are shown in FIG. 3. It was clearly demonstrated that (1) the oxidative precipitation of Mn(II) under neutral leach conditions is very slow by using $O_2$ alone, but can be significantly accelerated by mixing $SO_2$ gas into $O_2$ gas; (2) the oxidative precipitation rate of Mn(II) is proportional to the supply rate of $SO_2$ in the tested range. At $SO_2$ supply rate of 0.107 mole/hour, the oxidative precipitation of Mn(II) was 0.066 mole/hour.

Effect of $O_2/SO_2$ Molar Ratio

Figure 4:
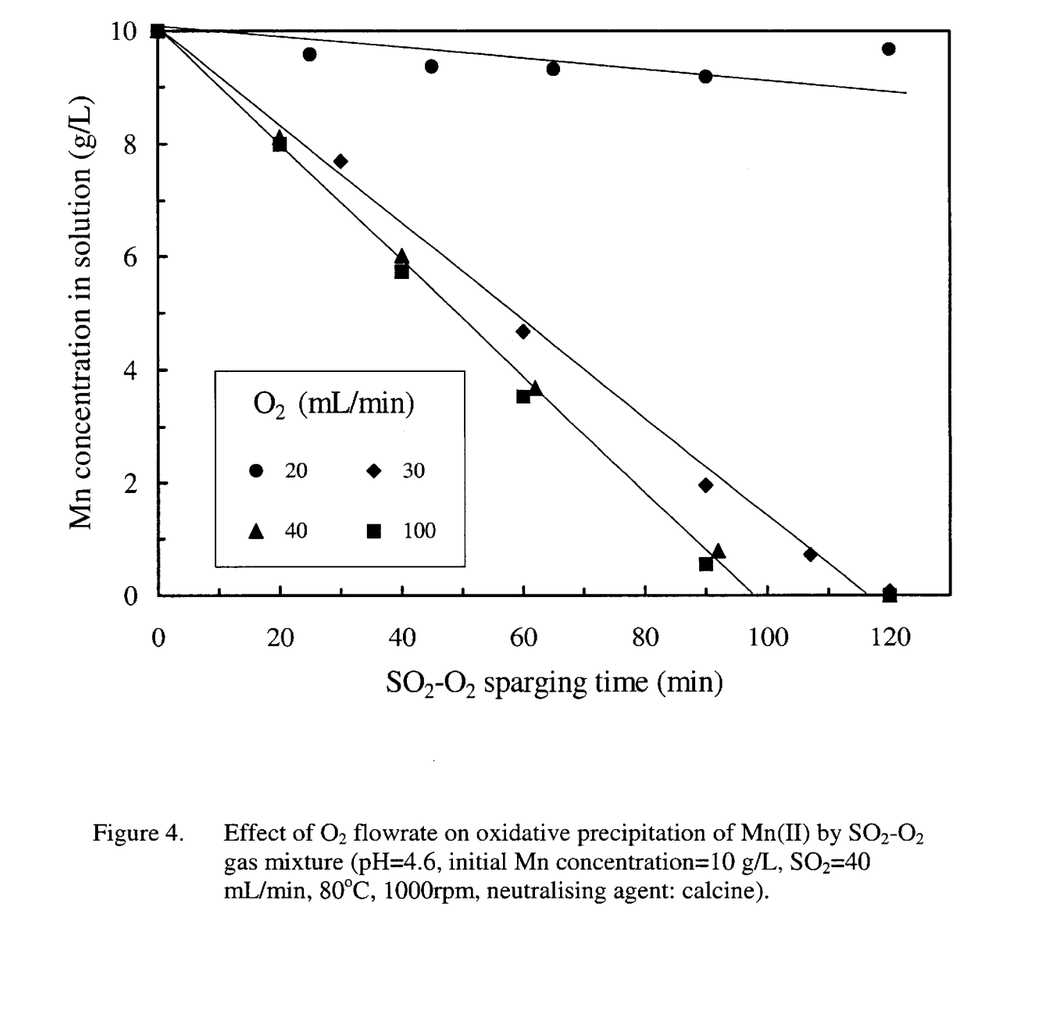
FIG. 4 is a graph showing the effects of the rate of addition of $O_2$ on the oxidative precipitation of manganese from a zinc leach solution.

FIG. 4 shows the effect of $O_2/SO_2$ molar ratio on oxidative precipitation of Mn(II). The $SO_2/O_2$ gas mixture with different $O_2/SO_2$ molar ratios were prepared by changing the $O_2$ flow rate in the range of 20 mL/min to 100 mL/min while keeping the $SO_2$ flow rate fixed at 40 mL/min. It can be seen that the kinetics for the oxidative precipitation of Mn(II) is independent of $O_2/SO_2$ molar ratio in the range of $\geq 1$, which is the value required theoretically to supply enough oxygen for the oxidation of both $SO_2$ supplied and Mn(II) in solution according to reactions (1) and/or (2):

$$2Mn^{2+}+SO_2+O_2+3H_2O \rightarrow Mn_2O_3+SO_4^{2-}+6H^+ \quad (1)$$

$$Mn^{2+}+SO_2+O_2+3H_2O \rightarrow MnO_2+SO_4^{2-}+4H^+ \quad (2)$$

These results suggest that both $SO_2$ and $O_2$ work efficiently in this process. So, there seems to be no need to provide large amount of excess oxygen, although it may be useful from a process standpoint.

Treatment of Neutral Leach Slurry

The oxidative precipitation of Mn(II) can be accomplished using $SO_2/O_2$ directly in the neutral leach slurry.

Figure 5:
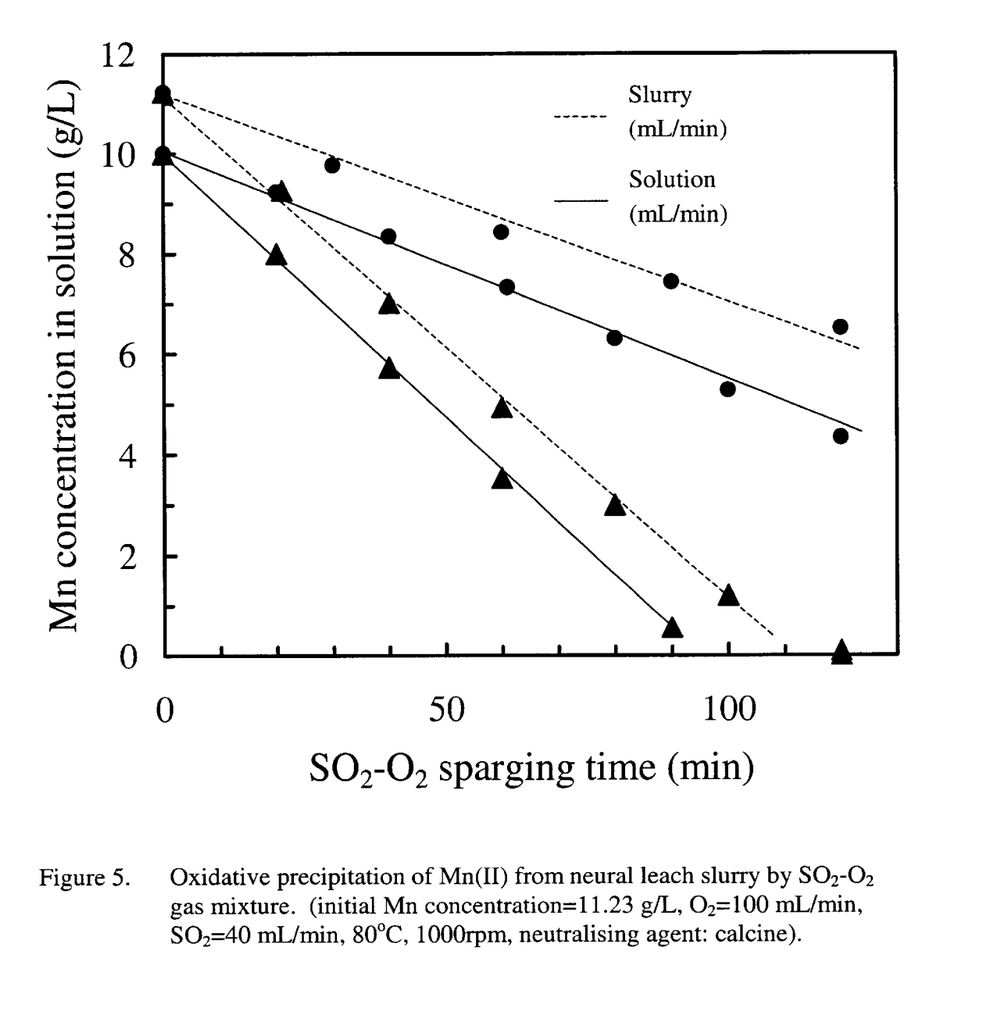
FIG. 5 is a graph comparing the effects of pH on the oxidative precipitation of manganese from a zinc leach solution and a zinc leach slurry.

FIG. 5 gives the typical results at pH 4 and pH 4.6. For a comparison, the results for the oxidative precipitation of Mn(II) in clarified neutral solution at pH 4 and pH 4.6 were re-plotted in the same Figure, expressed by dashed lines. At both pH 4 and 4.6, it can be observed that the neutral leach slurry and the clarified neutral solution give nearly the same kinetic rates in the oxidative precipitation of Mn(II) under the same conditions. It is clearly demonstrated that the oxidative precipitation of Mn(II) by using $SO_2/O_2$ gas mixture takes place in the same way in neutral leach slurry as that in clarified neutral leach solution. This implies that more options are available for the implementation of the Mn control process in zinc leach circuit, such as precipitating Mn from either of the unfiltered leach slurry or the leach solution, without the necessity of adding extra equipment. Also, the Mn can be precipitated at any convenient point in the leach circuit.

Modes of Application

On the basis of these findings, several options to control manganese in zinc leach circuits through the oxidative precipitation of Mn(II) by using $SO_2/O_2$ gas mixture may be considered. For illustrative purpose, three such options are discussed.

Figure 6:
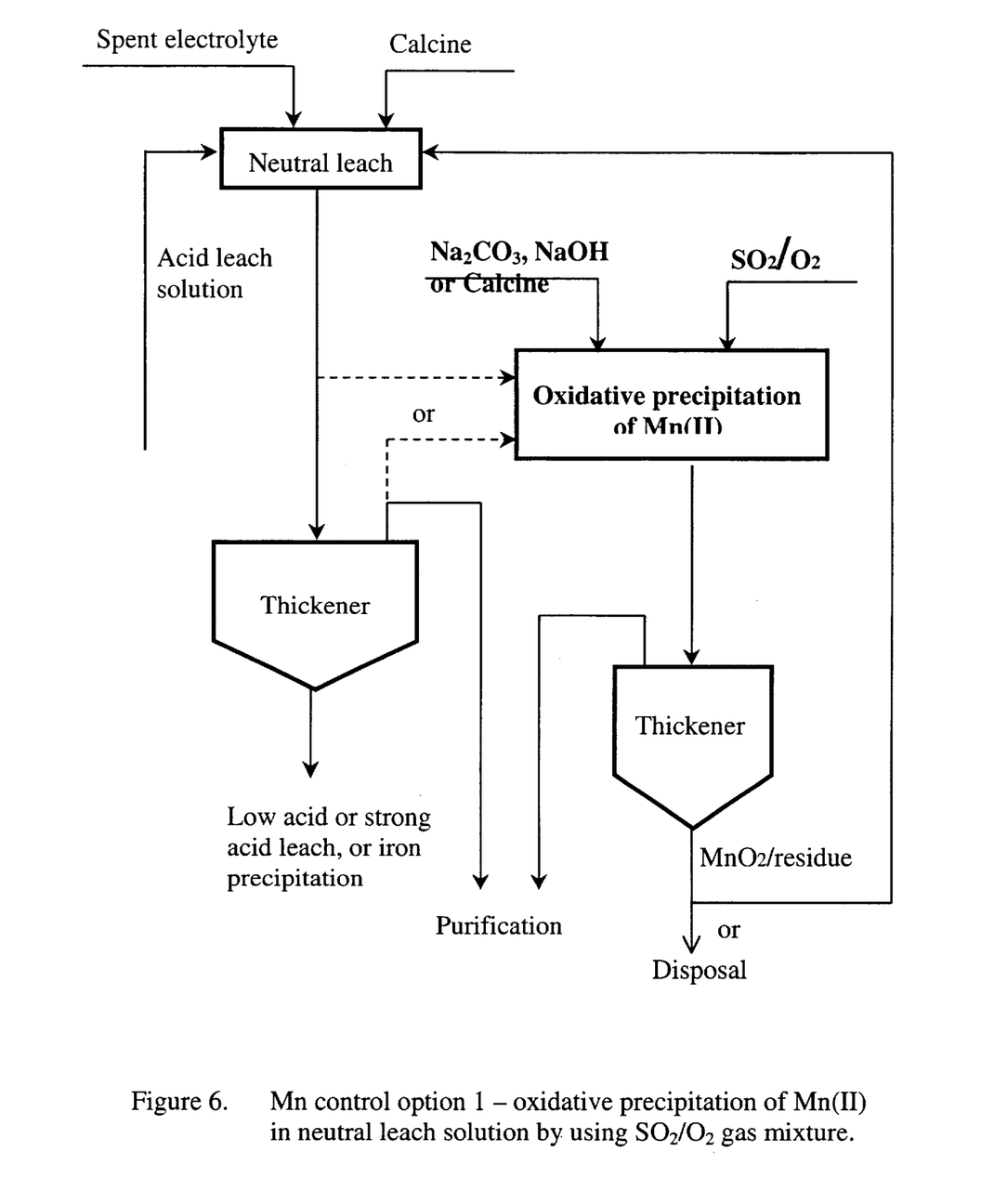
FIG. 6 is a flow chart illustrating a method of controlling manganese in a neutral zinc solution according to the present invention.

In option 1, which is illustrated in FIG. 6, a small portion of neutral leach solution is bled off the main stream, and treated in a separate tank through the oxidative precipitation of Mn(II) by using $SO_2/O_2$ gas mixture, as proposed in this invention, to reduce Mn(II) concentration to low level. $Na_2CO_3$, NaOH, $Mg(OH)_2$, calcine, or other suitable neutralising agents can be used as neutralising agent for pH control. The solid product generated in this operation contains Mn(III) and Mn(IV) oxides or hydroxides, together with leach residue if calcine is used as neutralising agent. This residue may be sent back to the leach or iron removal circuits for the recovery of zinc in the residue, if that is the case, and possibly for the use of the Mn(III)/Mn(IV) precipitate as oxidant to oxidise Fe(II) to Fe(III) and facilitate iron rejection. Alternatively, it may be disposed of. The clarified solution with low Mn(II) concentration is sent to purification stage. In this option, the operation for the oxidative precipitation of Mn(II) is small in scale, because only a fraction of the neutral leach solution is treated.

In option 2, the oxidative precipitation of Mn(II) is run in a combination with the neutral leach operation. The advantage of this option is that there is no need for additional equipment and extra space. The oxidative precipitation of Mn(II) can be implemented towards the end of the neutral leach tank cascade, simply by introducing $SO_2/O_2$ gas mixture into the leaching slurry. The favourable slurry pH of $\geq 4$ for the oxidative precipitation of Mn(II) can be reached and maintained by adding excess calcine.

In option 3, the oxidative precipitation of Mn(II) is run immediately following purification of the solution, with temperatures 20 to 100° C., but preferably in the range 40 to 70° C.

Figure 7:
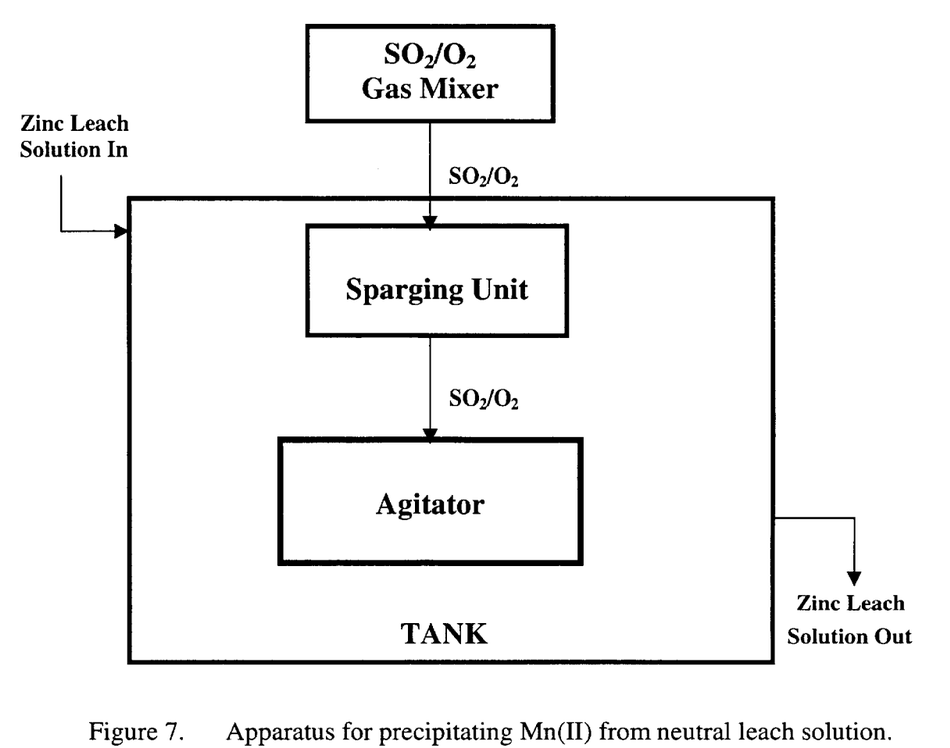
FIG. 7 is a block diagram illustrating an apparatus according to the present invention.

An apparatus according to the present invention is shown in FIG. 7. The apparatus may include means for mixing gaseous $SO_2$ and $O_2$ at a molar ratio of $O_2:SO_2 \geq 1$. It may also include a means for agitating the leach solution, and a means for sparging the gaseous $SO_2$ and $O_2$ into the agitated leach solution until a sufficient amount of manganese has been precipitated from the solution.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A method for removing manganese from a zinc leach solution without causing zinc to precipitate from the solution, comprising the step of reacting the solution with sulfite and oxygen.

2. The method according to claim 1, wherein a sulfite salt or a metabisulfite salt is used as the source of sulfite.

3. The method according to claim 1, wherein sulfur dioxide gas is used as the source of sulfite.

4. The method according to claim 1, wherein the sulfite and oxygen are reacted with the zinc leach solution for less than three hours.

5. The method according to claim 1, wherein the zinc leach solution contains from 30 to 170 g/L zinc.

6. The method according to claim 1, wherein the zinc leach solution contains from 1 to 25 g/L manganese.

7. The method according to claim 1, wherein the sulfite and oxygen are reacted with the zinc leach solution at a temperature of from 20–100° C.

8. The method according to claim 7, wherein the sulfite and oxygen are reacted with the zinc leach solution at a temperature of from 60–90° C.

9. The method according to claim 1, wherein the sulfite and oxygen are reacted with the zinc leach solution at a pH of from about 2 to about 6.

10. The method according to claim 9, wherein the sulfite and oxygen are reacted with the zinc leach solution at a pH of from 4.0 to 4.6.

11. The method according to claim 1, wherein the sulfite and oxygen are reacted with the zinc leach solution while the solution is being agitated.

12. The method according to claim 1, wherein the molar ratio of oxygen to sulfite is one or greater.

13. The method according to claim 1, wherein the pH of the zinc leach solution is maintained by adding a base.

14. The method according to claim 13, wherein the base is selected from the group consisting of sodium carbonate, sodium hydroxide, magnesium hydroxide, zinc calcine, and zinc oxides.

15. The method according to claim 1, wherein the sulfite and oxygen are reacted with the zinc leach solution in the presence of a seeder compound comprising a manganese (III) or (IV) compound.

16. A method for using gaseous sulfur dioxide and oxygen to remove manganese from a zinc leach solution, comprising the step of sparging the solution with sulfur dioxide and oxygen while agitating the solution, wherein the sparging is carried out at a temperature of from 60 to 90° C., at a pH of from 4.0 to 4.6, for three hours or less.

17. A method for controlling manganese in a zinc leach circuit, comprising the steps of:
bleeding off a portion of a zinc leach solution from a main stream of the zinc leach circuit into a separate tank;
treating the zinc leach solution with sulfite and oxygen to precipitate manganese from the solution without precipitating zinc from the solution;
neutralizing the pH of the zinc leach solution with a neutralizing agent during the manganese precipitation step; and
filtering the zinc leach solution to remove the precipitated manganese.

18. The method according to claim 17, wherein a sulfite salt or a metabisulfite salt is used as the source of sulfite.

19. The method according to claim 17, wherein sulfur dioxide gas is used as the source of sulfite.

20. The method according to claim 17, wherein the sulfite and oxygen are reacted with the zinc leach solution for less than three hours.

21. The method according to claim 17, wherein the zinc leach solution contains from 30 to 170 g/L zinc.

22. The method according to claim 17, wherein the zinc leach solution contains from 1 to 25 g/L manganese.

23. The method according to claim 17, wherein the sulfite and oxygen are reacted with the zinc leach solution at a temperature of from 20–100° C.

24. The method according to claim 23, wherein the sulfite and oxygen are reacted with the zinc leach solution at a temperature of from 60–90° C.

25. The method according to claim 17, wherein the sulfite and oxygen are reacted with the zinc leach solution at a pH of from about 2 to about 6.

26. The method according to claim 17, wherein the sulfite and oxygen are reacted with the zinc leach solution at a pH of from 4.0 to 4.6.

27. The method according to claim 17, wherein the sulfite and oxygen are reacted with the zinc leach solution while the solution is being agitated.

28. The method according to claim 17, wherein the molar ratio of oxygen to sulfite is one or greater.

29. The method according to claim 17, wherein the neutralizing agent is selected from the group consisting of sodium carbonate, sodium hydroxide, magnesium hydroxide, zinc calcine, and zinc oxides.

30. The method according to claim 17, wherein the sulfite and oxygen are reacted with the zinc leach solution in the presence of a seeder compound comprising a manganese (III) or (IV) compound.

31. A method for controlling manganese in a zinc leach circuit, comprising the steps of:
treating a zinc leach slurry within the zinc leach circuit with sulfite and oxygen to precipitate manganese from the slurry without precipitating zinc from the slurry; and
neutralizing the pH of the zinc leach slurry with a neutralizing agent during the manganese precipitation step.

32. The method according to claim 31, wherein a sulfite salt or a metabisulfite salt is used as the source of sulfite.

33. The method according to claim 31, wherein sulfur dioxide gas is used as the source of sulfite.

34. The method according to claim 31, wherein the sulfite and oxygen are reacted with the zinc leach slurry for less than three hours.

35. The method according to claim 31, wherein the zinc leach slurry contains from 30 to 170 g/L zinc.

36. The method according to claim 31, wherein the zinc leach slurry contains from 1 to 25 g/L manganese.

37. The method according to claim 31, wherein the sulfite and oxygen are reacted with the zinc leach slurry at a temperature of from 20–100° C.

38. The method according to claim 37, wherein the sulfite and oxygen are reacted with the zinc leach slurry at a temperature of from 60–90° C.

39. The method according to claim 31, wherein the sulfite and oxygen are reacted with the zinc leach slurry at a pH of from about 2 to about 6.

40. The method according to claim 39, wherein the sulfite and oxygen are reacted with the zinc leach slurry at a pH of from 4.0 to 4.6.

41. The method according to claim 31, wherein the sulfite and oxygen are reacted with the zinc leach slurry while the solution is being agitated.

42. The method according to claim 31, wherein the molar ratio of oxygen to sulfite is one or greater.

43. The method according to claim 31, wherein the neutralizing agent is selected from the group consisting of sodium carbonate, sodium hydroxide, magnesium hydroxide, zinc calcine, and zinc oxides.

44. The method according to claim 31, wherein the sulfite and oxygen are reacted with the zinc leach slurry in the presence of a seeder compound comprising a manganese (III) or (IV) compound.

45. A method for producing zinc from zinc sulfide concentrates having maganese therein, comprising the steps of;
leaching directly or after roasting the zinc sulfide concentrates in a sulfuric acid solution, to produce a zinc leach solution;
purifying the zinc leach solution; and
recovering zinc from the purified zinc leach solution by means of electrolysis;
wherein manganese present in the zinc leach solution is removed by reacting the zinc leach solution with sulfite and oxygen.

46. The method according to claim 45, wherein a sulfite salt or a metabisulfite salt is used as the source of sulfite.

47. The method according to claim 45, wherein sulfur dioxide gas is used as the source of sulfite.

48. The method according to claim 45, wherein the sulfite and oxygen are reacted with the zinc leach solution for less than three hours.

49. The method according to claim 45, wherein the zinc leach solution contains from 30 to 170 g/L zinc.

50. The method according to claim 45, wherein the zinc leach solution contains from 1 to 25 g/L manganese.

51. The method according to claim 45, wherein the sulfite and oxygen are reacted with the zinc leach solution at a temperature of from 20–100° C.

52. The method according to claim 51, wherein the sulfite and oxygen are reacted with the zinc leach solution at a temperature of from 60–90° C.

53. The method according to claim 45, wherein the sulfite and oxygen are reacted with the zinc leach solution at a pH of from about 2 to about 6.

54. The method according to claim 53, wherein the sulfite and oxygen are reacted with the zinc leach solution at a pH of from 4.0 to 4.6.

55. The method according to claim 45, wherein the sulfite and oxygen are reacted with the zinc leach solution while the solution is being agitated.

56. The method according to claim 45, wherein the molar ratio of oxygen to sulfite is one or greater.

57. The method according to claim 45, further comprising the step of maintaining the pH of the sulfuric acid solution by adding a neutralizing agent selected from the group consisting of sodium carbonate, sodium hydroxide, magnesium hydroxide, zinc calcine, and zinc oxides.

58. The method according to claim 45, wherein the sulfite and oxygen are reacted with the zinc leach solution in the presence of a seeder compound comprising a manganese (III) or (IV) compound.

59. A method for removing manganese from a zinc sulfate solution via oxidation, comprising the steps of:
mixing gaseous $SO_2$ and $O_2$ at a molar ratio of $O_2:SO_2 \geq$;
agitating the zinc sulfate solution; and
sparging the mixed $SO_2$ and $O_2$ into the agitated zinc sulfate solution until manganese is precipitated therefrom.

* * * * *